United States Patent Office 2,917,320
Patented Dec. 15, 1959

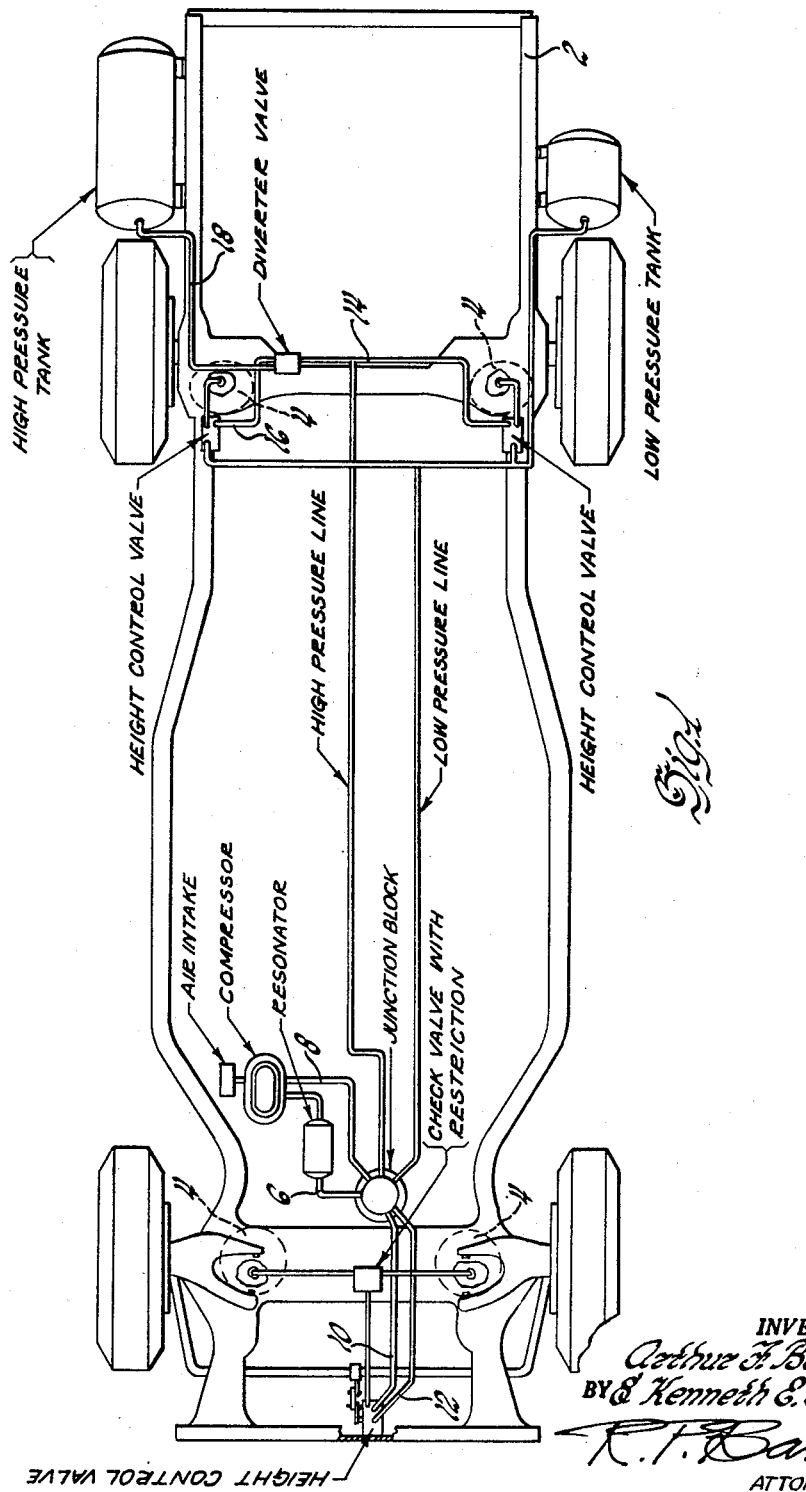

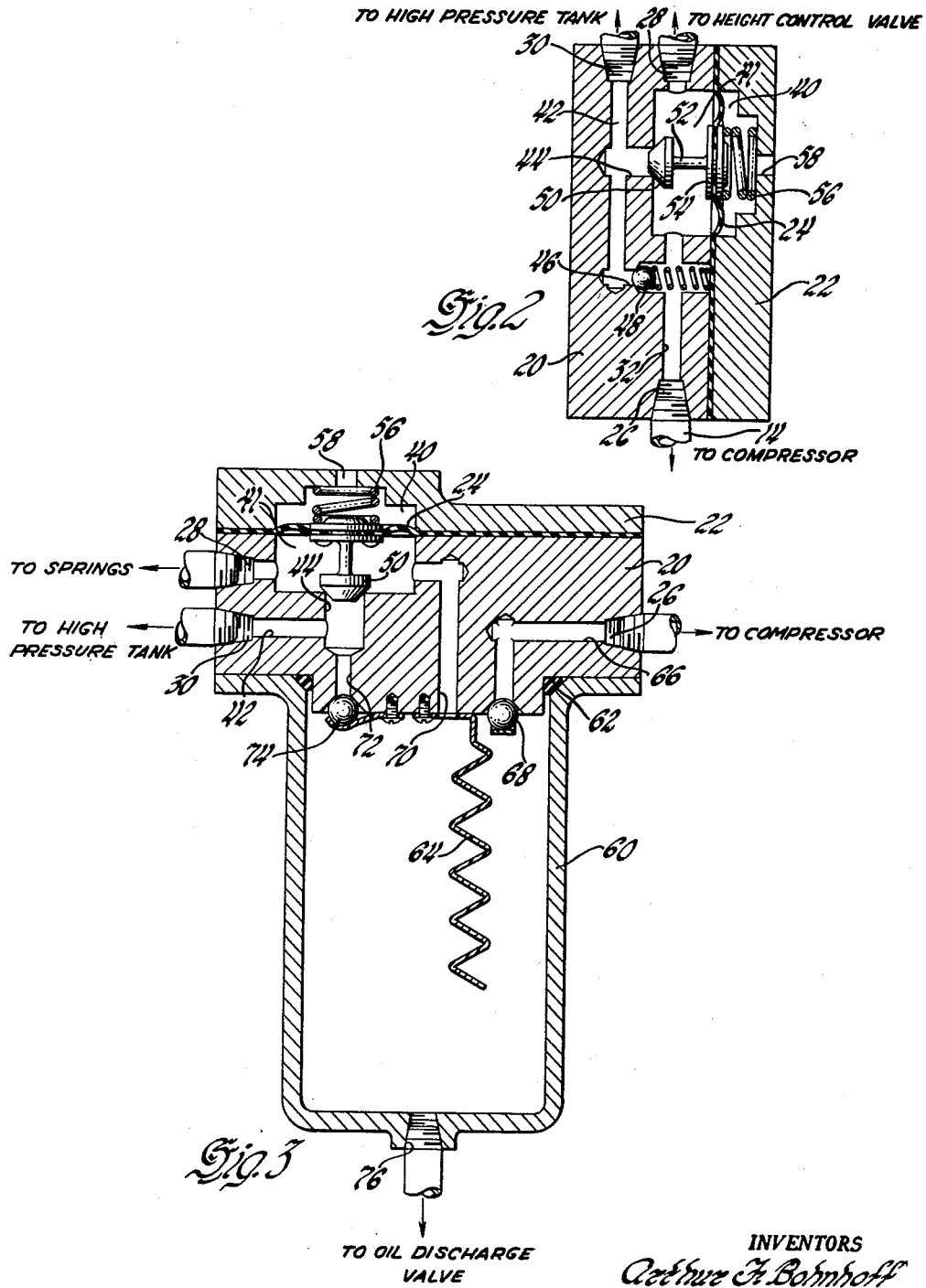

2,917,320

CONTROL APPARATUS FOR VEHICLE PNEUMATIC SUSPENSION

Arthur F. Bohnhoff, Saginaw, and Kenneth E. Faiver, Lansing, Mich., assignors to General Motors Corporation, Detroit, Mich., a corporation of Delaware Application May 20, 1957, Serial No. 660,388

6 Claims. (Cl. 280—124)

The present invention relates to a fluid system including a high pressure delivery line in fluid communication with a plurality of fluid receivers, and means for selectively controlling the supply of fluid from the line to respective receivers. More particularly, the present invention relates to a pneumatic suspension system which includes a high pressure delivery line in fluid communication with one or more fluid springs and a high pressure receiver, there being valve means in the high pressure line selectively controlling the supply of fluid therefrom to said spring or springs and the high pressure receiver.

For the purpose of illustration, the present invention has been illustrated in conjunction with a vehicle pneumatic suspension system. However, as will become more obvious hereinafter, the fluid system of this invention may be readily employed in other environments. However, it has been found to be particularly adaptable and advantageously employed in conjunction with the pneumatic suspension system to be described.

Pneumatic vehicle suspensions typically comprise a source of fluid under pressure, a high pressure delivery line, and a plurality of air springs operatively connected between a vehicle sprung mass and the ground engaging wheels to control the relative height therebetween. Suitable leveling or height control valves are associated with the suspension to operate in response to changes in the aforementioned relative height to supply or exhaust air as required from the respective air springs. A high pressure tank or receiver is also in fluid communication with the high pressure line so as to receive fluid from the source of fluid pressure.

The high pressure receiver or tank supplements the fluid source in supplying air as required by the various air springs. For example, when a car is left over night and the air springs bleed or leak to some extent, air may be supplied from the high pressure tank to the springs. When the vehicle is operating, the source of fluid functions to replenish the air in the high pressure tank.

In general, in fluid systems of the type comprising a high pressure line for supplying fluid under pressure to a plurality of receivers, it is often desirable to direct the flow of fluid first to one receiver and then to the other so as to rapidly fill the former. With particular reference to an air suspension system which includes a high pressure line, one or more air springs, and a high pressure storage tank, it is desirable to fill the air springs rapidly to bring the vehicle to a standing height. However, in conventional devices, this is not effected as efficiently as it could be inasmuch as the air passing through the high pressure line must ordinarily first fill the high pressure receiver before any appreciable amount of air is supplied to the spring or springs.

It is, therefore, a principal feature of this invention to provide a fluid system comprising a source of fluid under pressure, a high pressure line in fluid communication with this source and with a plurality of fluid receivers, and a diverter valve in the line for selectively controlling the supply of fluid to said receivers whereby all the fluid may be supplied to one receiver prior to supplying another receiver.

It is another feature and advantage of this invention to provide a diverter or shunt valve in the high pressure line of an air suspension system to initially shunt the flow of air past a high pressure storage tank to the air springs for rapidly bringing the vehicle to the desired standing height.

It is another object of this invention to provide a valve having an inlet port in fluid communication relationship with a source of fluid under pressure, a plurality of outlet ports in fluid communication with a plurality of fluid receivers, such as a vehicle air spring and high pressure tank, passageways within said valve to establish communication between the inlet and respective outlet ports thereof, and including a pressure control chamber in which a pressure regulator or control valve is disposed to function in response to the pressure in one of or a group of the receivers to shunt the supply of air to those receivers until such a time as they have received the required amount of air under pressure.

Referring to a pneumatic suspension system, it is normal to employ a reciprocating piston and cylinder type of compressor for supplying air to the air springs and high pressure tank. Moreover, the compressor employed in a fluid suspension system is usually of the balanced head or compression ratio controlled type; that is, its output pressure is a function of compression ratio and delivery. Thus, when the compressor, pumping into a receiver which is at atmospheric pressure we may define, for the sake of example, this condition as one of substantially zero gage output pressure in which, although a relatively high volume of air is being supplied by the pump, the work output of the pump is at a minimum. On the other hand, at maximum output pressure when the receiver is filled, the air output is zero and the work output of the pump is also at a minimum. When either of these conditions occur, heating in the compressor is at a minimum. A maximum or critical temperature rise occurs somewhere between the zero and maixmum pressure conditions, at which time (critical pressure condition) output of compressed air is relatively large. Thus, to prevent the compressor from heating to the critical temperature, it is desirable to design the system in such a manner as to preclude the critical pressure condition from occurring.

Therefore, it is another object of this invention to so design the pressure control valve of the aforementioned diverter valve in such a manner as to insure it to open at a pressure in excess of the aforementioned critical pressure whatever it might be for a particular system, thereby causing the compressor to work against a head of pressure to reduce air delivery.

According to another feature of this invention, it is well to note that pneumatic suspension systems may be of either the "open" or "closed" type. In the "open" type of system, the compressor draws air from atmosphere and supplies it to the air springs and high pressure tank, air being exhausted from the springs to atmosphere. In the "closed" type of system, on the other hand, a low pressure tank is provided for receiving exhaust air from the springs, a return line being used to conduct super atmospheric air from the low pressure tank to the inlet of the compressor. If desired, an air intake or makeup valve may be provided in the compressor to supply any deficiency in the air supply in the "closed" system. A particular problem is presented in such a system by reason of the fact that the compressor always seems to leak some oil into the air supply. Moreover, and particularly in an "open" type system, moisture may be picked up from the atmosphere and deleteriously affect the system.

Therefore, according to this feature of the invention, air-liquid separator means is provided between the compressor and the receivers being supplied so as to filter out oil and other liquids in the air.

These and other features, objects and advantages of this invention will appear more fully hereinafter as the description of the invention proceeds, and in which reference is made to the following drawings in which:

Figure 1 is a schematic view of the fluid system of this invention incorporated into a vehicle air suspension;

Figure 2 is a cross-sectional view of a diverter valve included in the system to selectively control the supply of fluid to a plurality of receivers;

Figure 3 is another embodiment of a diverter valve with the inclusion of an air-liquid separator tank.

Referring now to the drawings, and particularly Figure 1, the fluid system of this invention is shown by way of example as incorporated in a pneumatic vehicle suspension where it is particularly advantageously employed. As is usual, the vehicle frame 2 is mounted on wheels for relative movement therebetween as controlled by a plurality of air springs 4 disposed at the front and rear of the vehicle. A height control valve is associated with each rear spring, while a single valve controls the air springs at the front of the vehicle. It will be appreciated that these valves are of any conventional type and may be actuated in any suitable manner such as connecting them to one or the other relatively movable vehicle parts by suitable linkage.

The suspension herein shown is of the "closed" type including a compressor, preferably of the reciprocating type, junction block, high pressure tank and low pressure tank. The compressor is connected by a delivery line 6 through a resonator to the junction block, there also being a return line 8 between the junction block and compressor. The delivery line 6 is connected through the junction block with a high pressure line to the height control valves and high pressure tank at the rear of the vehicle and by a high pressure line 10 to the front height control valve. Similarly, a low pressure line connects the low pressure tank to the junction block while a low pressure line 12 connects the forward height control valve to this junction block. It will be appreciated that the junction block may be of any usual type in which the lines 6 and 10 are in the high pressure line of the system, while the lines 8 and 12 are in the low pressure line of the system. Naturally, both pressure lines communicate as shown with the respective height control valves to control functioning of the air springs.

The single height control valve at the front of the vehicle supplies air to the front springs through a check valve having a restriction therein to prevent rapid cross flow of air between the front air springs. This feature per se forms no part of the present invention.

At the rear end of the high pressure line, the latter branches at 14 for supply to the respective height control valves of the air springs. In this line, a diverter valve is provided for the purpose of shunting the high pressure tank when required to fill the respective air springs rapidly to bring the vehicle to the desired standing height. The diverter valve is connected to the height control valve and high pressure tank by the lines 16 and 18, respectively.

Figure 2 depicts a preferred form of the diverter valve of this invention, and includes a valve body 20 having a cover 22 with a flexible diaphragm 24 clamped therebetween for a purpose which will appear more fully hereinafter. The valve includes an inlet port 26 in fluid communicating relationship with the high pressure line 14, and two outlet ports 28 and 30 respectively connected to the height control valves and the high pressure tank.

Means are provided within the valve for establishing selective communication between the valve inlet 26 and the outlet ports 28 and 30, and includes the passageway 32 opening into a pressure control chamber 41 which is in fluid communication with the outlet port 28. Moreover, a second passageway 42 connected to port 30 has a port 44 opening to the control chamber 41 and a port 46 opening to the passageway 32. A spring biased one-way ball check valve 48 is employed to prevent communication between the passageways 32 and 42, while permitting reverse flow of fluid under certain conditions which will appear more fully hereinafter.

A pressure regulator control valve is disposed within the chamber 41 and includes a valve head 50 having a stem portion 52 connected to a support portion 54 clamped or otherwise suitably secured to the flexible diaphragm 24. A resilient spring 56 is disposed between the diaphragm 24 and the cover 22 of the valve. A vent 58 to atmosphere is formed in the cover 22 and communicates with the chamber 40 on the spring side of the diaphragm.

Let us assume that the air springs are at a pressure less than that required to maintain vehicle standing height. Upon starting the vehicle and with it the compressor, it is desirable to supply air through the high pressure line to the respective air springs to fill them as rapidly as possible. To accomplish this, it is necessary to divert air or shunt it from the high pressure tank. If the latter is also supplied, a time delay will result in bringing the vehicle to the desired standing height. Air will flow from the compressor through the high pressure line toward the respective height control valves. Air enters the valve inlet port 26 and passes through the passageway 32 into the chamber 41 and out the outlet port 28 to the air springs. Of course, while this is occurring, air is not being supplied to the high pressure tank, since valve 50 is closed. The shunting of the high pressure tank occurs by reason of the pressure in the air springs and, therefore, in the pressure control chamber 41 being less than that required to unseat the valve 50 from the port 44.

When the requirements of the air springs have been satisfied and the respective height control valves are closed so that no more air is allowed to flow through outlet port 28, then the pressure in the small chamber 41 increases rapidly, due to the relatively large compressor output, and when it reaches the value necessary to unseat valve 50 against the force of spring 56, this valve 50 opens to permit air from the compressor to flow through passage 32, through chamber 41, into passage 42, through outlet port 30, into the high pressure tank. When the air pressure in the latter has reached the stabilized pressure of the compressor, minimum air flow results. As air is required for leveling, while the car is in operation, both the high pressure tank and compressor will cooperate to maintain the desired vehicle height. To be completely effective in diverting air to the air springs and prevent filling the high pressure tank before the air springs are satisfied, the pressure at which valve 50 unseats must be somewhat above the maximum air spring pressure requirements.

The check valve 48 is provided to permit air to flow from the high pressure tank to the air springs as required to maintain proper vehicle height when load changes occur, and the compressor is not functioning. For example, when an empty car, which has automatically adjusted to proper height at the time of unloading, is again loaded with passengers, air from the high pressure tank is used to levelize to proper height, even though the engine and compressor are not running. Air from the high pressure tank is thus also made available for car height adjustment to compensate for air volume changes due to temperature changes, and due to minor leakage in the system.

Naturally, the pressures at which the pressure control valve and spring biased check valve are designed to open depend upon the characteristics of the system. However, in a compression ratio controlled or balanced head compressor, it is desirable to set the valve 50 to function at some pressure above the critical pressure of the compressor, as aforedescribed, so as to act as a thermal protective device for the compressor. Thus, the pressure regulator valve may be designed so that it will open at a pressure above this critical pressure whatever it might be in any particular system. In this regard, even though some pressure drop will occur in the high pressure line when the pressure regulator valve 50 opens to communicate the high pressure tank with the compressor, the valve can be so designed as to keep the range of fluctuation above the critical pressure.

Another form of diverter valve is shown in Figure 3, and includes therewith an air-liquid separator tank 60 as will appear more fully hereinafter. In this form of the invention, the diverter valve function is the same as that shown in Figure 2. An air-liquid separator tank 60 is suitably disposed on a seal 62 against the valve body 20. Baffle means 64 are provided within the separator tank adjacent the inlet thereto from the passageway 66 in communication with the inlet port 26. A one-way spring biased ball check valve 68 permits flow between the passageway 66 and the separator tank, but prevents flow in the reverse direction. A second passageway 70 establishes fluid communication in both directions between the separator tank and the pressure control chamber 41 from which air may flow through the outlet port 28 to the air spring. As in the Figure 2 embodiment the high pressure tank port 30 is connected by passage 42 with a port 44 leading to the control chamber 41, and by a port 72 with the separator tank. The port 72 is controlled by a one-way spring biased check valve 74. A liquid discharge port 76 is provided in the separator tank, and may also include suitable valve means to control draining from the tank.

In operation, air is supplied through the passageway 66 past the check valve 68 to strike the baffle means 64 thereby separating oil and other moisture from the air. The air then flows through the open passageway 70 to the pressure control chamber 41 and to the air springs as required as described in the previous embodiment. After the pressure in chamber 41 has been raised to the desired amount, the pressure regulator valve 50 opens thereby permitting air to flow through the port 44 and passage 42 to the high pressure tank as before. The ball check valve 74 functions similar to the ball check valve 48 in the Figure 2 embodiment to permit flow of air from the high pressure tank to the springs as required, for example, when the compressor is not running. The ball check valve 68 prevents air from returning through the high pressure line to the compressor. During fluid transfer under these conditions, air flows through the port 30 past the check valve 74 through the passageway 70 to the pressure control chamber 41 and to the air springs.

While the diverter valve shown in Figure 3 may be placed in the position indicated in Figure 1, it will be quite obvious that to most effectively perform its separating function it should be placed as near to the compressor as possible. Thus, when this form of the diverter valve is used, it is preferably mounted in the high pressure line at the compressor delivery line. In this position, the high pressure line serving the air springs will be connected to the port 28, while a separate line to the high pressure tank is connected to port 30.

It will, therefore, be seen that we have provided a novel and relatively simple means for diverting air from one fluid pressure receiving means to another until said other means reaches a predetermined desired pressure at which time the other receiving means can be loaded. Moreover, such a diverting means is particularly advantageously employed in a pneumatic vehicle suspension system as aforedescribed. Moreover, we have provided a novel separator tank in combination with the diverter means for removing liquid from the air so supplied. While but two embodiments of this invention have been disclosed by way of illustration, it will be apparent that others skilled in the art will recognize other ways in which to design the diverter valve of this invention and, therefore, it is to be understood that we do not intend to be limited by the embodiments shown, but only by the claims appended hereto.

What is claimed is:

1. A fluid suspension system for a vehicle comprising a frame, ground engaging wheels, and fluid spring means controlling relative movement between said frame and wheels; said system comprising a source of fluid under pressure, a reservoir for said fluid under pressure, conduit means connecting said source to said fluid spring means and to said reservoir, a diverter valve in said conduit means, said valve including an inlet connected to said source and outlets connected, respectively, to said air spring means and said reservoir, a passageway connecting said valve inlet and the outlet therefrom to said fluid spring means, a second valve passageway connecting said first passageway and said valve outlet to said reservoir, a pressure controlled check valve operative to close communication between said first and second passageways to shunt supply of fluid from said source around said reservoir to said fluid spring means, said check valve including means responsive to increase in pressure in said first passageway upon said fluid spring means being supplied its requirement of fluid to open said valve and second passageway.

2. A fluid suspension system for a vehicle comprising a frame, ground engaging wheels, and fluid spring means controlling relative movement between said frame and wheels, said system comprising a source of fluid under pressure, a reservoir for said fluid under pressure, conduit means connecting the outlet of said source to said fluid spring means and to said reservoir, a diverter valve in said conduit means, said valve including an inlet connected to said source and outlets connected, respectively, to said air spring means and said reservoir, a passageway connecting said valve inlet and the outlet therefrom to said fluid spring means, a second valve passageway connecting said first passageway and said valve outlet to said reservoir, a pressure controlled valve operative to close communication between said first and second passageways to shunt supply of fluid from said source around said reservoir to said fluid spring means, said valve including means responsive to increase in pressure in said first passageway upon said fluid spring means being supplied its requirement of fluid to open said second passageway, and a check valve normally closing communication between said first and second passageways and operable upon a pressure differential occurring in the latter to supply fluid from said reservoir to said fluid spring means.

3. In an air suspension system for a vehicle comprising a frame, ground engaging wheels, and a plurality of air springs operatively connected to said frame and wheels to control the height of the former with respect to the latter; the combination of a high pressure delivery line, a source of fluid under pressure, a high pressure reservoir tank, said reservoir, air springs, and source being connected to said high pressure line, a diverter valve in said line between said source and said reservoir and air springs, said diverter valve including an inlet in communication with said source, an outlet communicating with said air springs, an outlet communicating with said reservoir, a pressure control chamber in fluid communication with said valve inlet and the outlet thereof to said air springs, a passageway establishing communication between said chamber and said outlet to said reservoir, and a valve controlling the flow of fluid from said chamber to said passageway, said valve being responsive to pressure in said chamber to open said passageway.

4. In an air suspension system for a vehicle comprising a frame, ground engaging wheels, and a plurality of air springs operatively connected to said frame and wheels to control the height of the former with respect to the latter; the combination of a high pressure delivery line, a source of air under pressure, a high pressure reservoir, said reservoir, air springs, and source being connected to said high pressure line, a diverter valve in said line between said source and said reservoir and air springs; said diverter valve including an inlet in fluid communication with said source, an outlet communicating with said air springs, an outlet communicating with said reservoir, a pressure control chamber in fluid communication with said valve inlet and the outlet thereof to said air springs, a first passageway establishing communication between said chamber and said outlet to the reservoir, a valve controlling the flow of fluid from said chamber to said passageway, said valve being responsive to pressure in said chamber to open said passageway, a port establishing fluid communication from said passageway to said chamber, a check valve normally closing said port, said check valve being responsive to a pressure differential between said passageway and chamber to supply fluid directly from said reservoir through said chamber to said air springs.

5. In an air suspension system for a vehicle comprising a frame, ground engaging wheels, and a plurality of air springs operatively connected to said frame and wheels to control the height of the former with respect to the latter; the combination of a high pressure delivery line, an air compressor, a high pressure reservoir tank, said reservoir, air springs, and source being connected to said high pressure line, a diverter valve in said line between said compressor and said reservoir and air springs; said diverter valve including an inlet in fluid communication with said compressor, an outlet communicating with said air springs, an outlet communicating with said reservoir, a pressure control chamber in fluid communication with said valve inlet and the outlet thereof to said air springs, a passageway establishing fluid communication between said chamber and said outlet to the reservoir, and a valve controlling the flow of fluid from said chamber to said passageway, said valve being responsive to pressure in said chamber to open said passageway, at a pressure above the critical pressure of said compressor.

6. A fluid supply system comprising a source of fluid under pressure, a high pressure delivery line in communication with the outlet of said source, a diverter valve having an inlet in communication with said high pressure line, said valve having a plurality of outlets, a plurality of fluid receivers, independent conduit means establishing communication between said receiving means and said outlet ports, a separator tank, a first passageway in said diverter valve establishing one-way fluid communication from said valve inlet to said tank, a second passageway establishing fluid communication between said tank and one of said valve outlets, a third passageway establishing fluid communication between said second passageway and another of said fluid receiving means, a valve controlling flow of fluid from said second passageway to said third passageway, said valve being normally closed to close said third passageway in response to a relatively low pressure in said second passageway, and operating in response to an increase in fluid pressure in said second passageway to open fluid communication between the latter and said third passageway, a fourth passageway establishing fluid communication between said third passageway and said tank, check valve means controlling one-way flow of fluid from said third passageway to said tank, said check valve means being operative in response to a pressure in said third passageway in excess of that contained in said second passageway to permit the flow of fluid from said third passageway through said tank and second passageway to said one valve outlet, and baffle means mounted within said tank adjacent the discharge thereto from said first passageway to remove contaminants from the fluid flowing therethrough.

References Cited in the file of this patent
UNITED STATES PATENTS

| | | |
|---|---|---|
| 1,371,648 | Schmidt | Mar. 15, 1921 |
| 1,464,680 | Lassen | Aug. 14, 1923 |
| 2,244,384 | Bissinger | June 3, 1941 |
| 2,585,575 | Nedergaard | Feb. 12, 1952 |